July 11, 1967 L. R. TEEPLE, JR 3,330,616

FILM MOTION COMPENSATOR FOR A MOTION PICTURE CAMERA

Filed July 3, 1964

INVENTOR.
LAWRENCE R TEEPLE JR
BY
Fryer + Ljunwald
ATTORNEYS

United States Patent Office 3,330,616
Patented July 11, 1967

3,330,616
FILM MOTION COMPENSATOR FOR A MOTION PICTURE CAMERA
Lawrence R. Teeple, Jr., Palo Alto, Calif., assignor to Beckman & Whitley, Inc., San Carlos, Calif., a corporation of Delaware
Filed July 3, 1964, Ser. No. 380,163
2 Claims. (Cl. 352—109)

This invention relates to compensating means which enables a moving strip of film to receive a record of a focused image to make possible the production of a motion picture on a continuously moving rather than intermittently moving film.

The intermittent motion of a conventional motion picture camera gives rise to difficulty in the production of sound film because the sound created by the camera mechanism must be sufficiently isolated from the microphone recording the desired sound to prevent confusion on the record. Furthermore, the starting and stopping of the film makes the recording of sound thereon very difficult and prevents problems which are not present where continually moving film is used. In practice, it is common to make two separate films or tapes in different machines, one being the photographic record and the other the sound record. These tapes are used as masters from which a plurality of single films bearing both types of records is made.

The use of such systems is complex and costly and is also unwieldly where readily portable equipment is desired as for making records of newsworthy events wherever they may take place. As a matter of fact, so-called "news reels" seldom have both picture and sound recorded and projected from the same film strip.

Equipment for taking and projecting motion pictures without intermittent film motion is known but is believed never to have been used as a silencing means to enable the production of a sound and photographic record on the same film at the same time and with the same compact and easily portable recording machine.

Another fact which has deterred the use of continuously moving film in motion picture cameras is that known methods of compensating the film motion have failed to give satisfactory resolution, steadiness of picture and frame registration. Briefly stated, this results from attempts to use a moving mirror for projecting a focused image directly onto a film surface. The mirror is moved angularly about an axis coincident with its reflecting surface. This swings the image projected by the mirror through an arcuate path. In the past the film surface has been arranged in an arc but since the image is flat, it does not coincide perfectly with the arc of the film and resolution is poor.

It is the object of the present invention to provide a motion picture camera for producing a photographic record and a sound record simultaneously on the same film strip which includes means to produce highly resolved photographic records on a continuously moving photographic film.

Further and more specific objects and advantages of the invention and the manner in which they are carried into practice are made apparent in the following specification by reference to the accompanying drawings.

Figure 1:
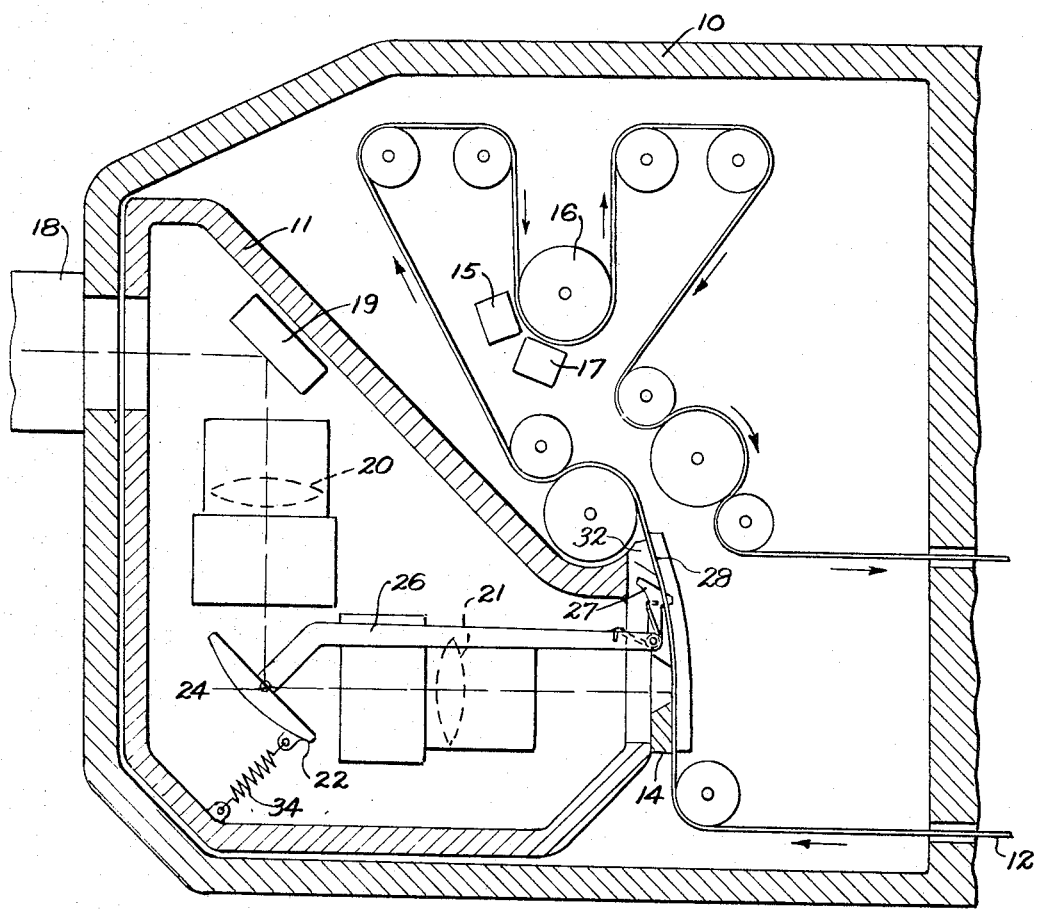
FIG. 1 is a schematic view illustrating the relative positions of optical components, film and sound recording components in a camera embodying the present invention.
Figure 2:
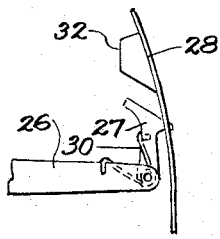
FIG. 2 is an enlarged fragmentary view of a part of the mechanism shown in FIG. 1.

The portion of the camera schematically shown in FIG. 1 comprises a main housing 10 and a smaller internal housing 11 which encloses the optical components of the camera. A film 12 is moved at a constant rate of speed by drive means, not illustrated, over a plurality of guide rollers as shown, the direction of movement being indicated by arrows. The film is withdrawn from one reel and taken up by another reel both contained in a housing, not shown, adjacent the housing 10.

A film gate 14 exposes the film to an image focused upon it by the optical system in the housing 11 while a transducer shown at 15 produces a record of sound upon the film as it passes over a non-ferrous roller 16. A second transducer illustrated at 17 is provided for the purpose of playing back the sound recorded on the film while the film is still contained within the camera. The circuits in which the transducers are included are conventional electronic circuits which form no part of the present invention.

The camera optics comprise an objective system contained in the housing partially shown at 18 and a fixed mirror 19 which reflects a beam of light from the objective system right angularly toward a lens positioned as shown at 20. The lens 20 is one component of a relay lens system which includes a second lens shown at 21. The lenses 20 and 21 are right angularly related and the beam of light between them is reflected by a mirror 22. The mirror is pivotally supported about an axis indicated at 24 which is coincident with its reflecting surface and oscillating movement is imparted to the mirror by a lever 26 which has a small hook 27 pivoted to its end in a position for engagement with the sprocket perforations of the film where it passes over an arcuate guide 28. The guide 28 is formed on an arc having its center at the pivot point of the lever 26 so that the hook travels the same path as the film. A small spring 30 urges the hook toward its position of engagement with a sprocket hole in the film so that movement of the film swings the lever 26 and mirror 24 in a counterclockwise direction as viewed in FIG. 1 until the end of the hook engages a stationary cam 32 which swings the hook out of engagement with the film enabling return of the lever 26 and mirror under influence of a spring 34. This cycle is repeated as the film moves and causes the image, which is focused at the surface of the film, to move with the film to create a highly resolved record on the film during its uninterrupted motion.

The return movement of the mirror under influence of the spring 34 may be so rapid that the effect of light upon the film during this period is negligible or conventional shuttering means may be employed if desired to eliminate all light during this period. The angular speed of a light beam reflected from a rotating mirror is twice the speed of rotation of the mirror and it is therefore necessary that the mirror 22 be oscillated at an angular speed which is one-half the angular speed of the film at the film gate 14. This is accomplished by making the distance between the mirror and the film twice the distance of the focal length of the lens 21.

Figures 3, 4:
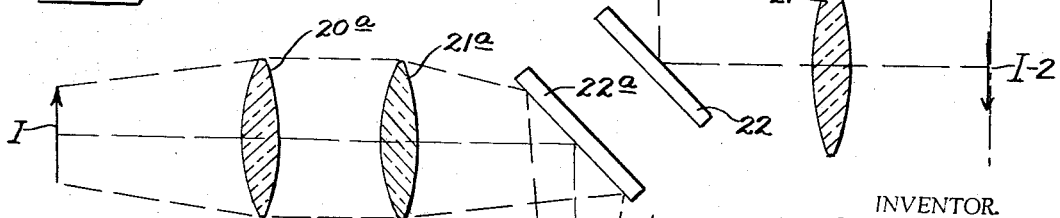
FIG. 3 is a schematic illustration of the relative position of relay lenses and a rotating mirror in a previously known but undesirable means for compensating film motion.
FIG. 4 is a schematic view showing the relationship of relay lenses and oscillating mirror of the present camera.

One salient feature of the present invention is the interposition of the oscillating mirror 22 between the relay lenses 20 and 21. Attempts to use such an oscillating mirror in another position have produced inferior results. One such other position is illustrated in FIG. 3 wherein relay lenses 20a and 21a corresponding to the lenses 20 and 21 are shown with an oscillating mirror 22a disposed between the lens 21a and an arcuately supported film represented by the broken line 12a. In this case an image represented at I in a beam of light from an objective system is focused by the relay lenses and reflected by the mirror to appear at I–2 approximately on the film surface. However since the image is created in a flat plane, it does not register perfectly with the curved plane of the film and it is necessary that the film be arcuately arranged because, since the focal length of lens 21a remains constant, oscillation of the mirror causes the image to move in an arcuate path.

The contrasting arrangement of the present invention is illustrated in FIG. 4 where mirror 22 is disposed between lenses 20 and 21. Since lenses have a focal plane which is flat as illustrated at 12b in FIG. 4 as distinguished from the path 12a of an image reflected by an oscillating mirror in FIG. 3, it is possible with this arrangement to produce the flat image I–2 perfectly coincident with the sensitized surface of the film. Consequently upon movement of the film and image at precisely the same speed excellent resolution is obtained. It is necessary to obtain the results illustrated by the diagram of FIG. 4 that the mirror 22 be placed between the nodal points of the lenses 20 and 21 where the image is a focal and is yet to be brought to focus by the lens 21 at the film surface.

Because of the extremely low level of sound created by the constantly moving film, it is possible to produce a sound record on the same film in the same housing and at the same time that a photographic record is being produced as with the transducer shown at 15.

While this invention has been described in connection with a camera, it is of course equally well adaptable to the projection phase of cinemaphotography because light passing through film as it moves past the film gate 14 in the direction opposite to that described herein will serve to project a record on the film onto a screen where it may be viewed all in a very well known manner.

The invention has been described using as an example a camera having objective and relay systems where two images occur. In other types of cameras where relay lenses are not used and a single image is produced at the film surface the arrows I in FIGS. 3 and 4 would represent the object itself and I–2 the only image. In any event the advantages of the present invention can only be realized when the oscillating mirror is separated from the film by the last component of the system which creates imaging at the film surface.

I claim:

1. A motion picture camera comprising a frame gate, an optical system including a stationary two lens relay for focusing an image of an event to be recorded at said gate, means to support and move film continuously past said gate in one direction on a flat film plane, a mirror interposed between the nodal points of said two lenses of the relay system to intercept the beam in the optical system, and means to oscillate the mirror to cause the image to move with the film at the frame gate in a flat image plane coincident with the film plane intermittently.

2. The combination of claim 1 in which the two lenses are arranged with their optical axes at an angle to each other, and the mirror is disposed at the intersection of said axes.

References Cited
UNITED STATES PATENTS

| | | | |
|---|---|---|---|
| 1,539,579 | 5/1925 | Kucharski | 352—106 |
| 3,196,457 | 7/1965 | Buck | 325—109 |
| 3,212,839 | 10/1965 | Graves | 352—109 |

FOREIGN PATENTS

| | | |
|---|---|---|
| 528,246 | 6/1931 | Germany. |
| 301,082 | 6/1929 | Great Britain. |

JULIA E. COINER, *Primary Examiner.*